Figure 1:
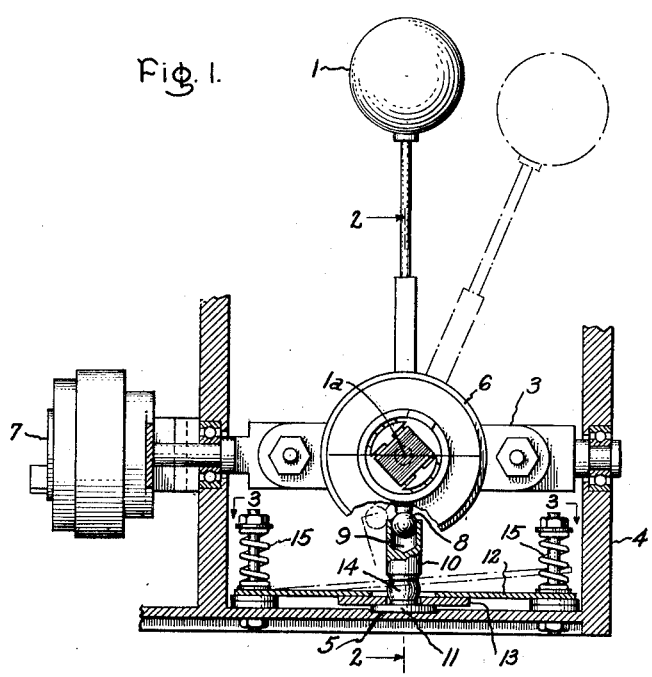

Jan. 23, 1951   W. W. WILLOUGHBY   2,539,217
CONTROL MECHANISM
Filed July 7, 1948

Inventor:
William W. Willoughby,
by  *Claude A. Mort*
His Attorney.

Patented Jan. 23, 1951

2,539,217

UNITED STATES PATENT OFFICE 2,539,217

CONTROL MECHANISM

William W. Willoughby, Hilton Village, Va., assignor to General Electric Company, a corporation of New York Application July 7, 1948, Serial No. 37,383

5 Claims. (Cl. 74—470)

My invention relates to universal control mechanisms provided with a universally movable control handle or stick such as used in the control of aircraft and the like and has for its object simple, reliable and efficient means for returning the control handle to a predetermined neutral position by a biasing force having substantially the same values in all positions of the handle thereby to reduce operating fatigue.

My invention relates particularly to an erection mechanism for centering a gimbal mounted control that is to operate electric devices for transmitting its movement to control mechanisms.

In small airplanes the pilot's controls are connected to the control surfaces through mechanical linkages. The effect of the air upon the control surfaces is communicated back through the linkage, affecting the ease of movement of the control stick as the pilot applies a signal to move the controls. This manifestation in the control stick is called "feel." The pilot when training in such a plane, learns to use this "feel" as part of his flying judgment.

The control surfaces of large aircraft due to their size must be operated electrically or hydraulically so that the control mechanism merely transmits signals to a separate operating means instead of being itself connected with the surfaces. Therefore, the "feel" of the control stick is missing. Several methods have been used to bring "feel" into the control stick but since each entails opposition to the pilot's movement and causes fatigue, they are now left out. Even though in the beginning of their training in large planes the pilots miss "feel" as an operational aid, they learn instead to base their judgment upon the changing attitudes of the plane itself.

To take over control from the automatic pilot and operate the plane manually, the pilot throws a switch connecting in the control mechanism and operates the control stick. When manual control is relinquished and the control stick is released, it automatically returns to its neutral position ready for resumption of control by the automatic pilot. The attitude of the control stick in its neutral position during straight and level flight is vertical, so that a control stick is a "normally vertical member."

In accordance with my invention, the lower end of the extension of a control handle is constrained to move with the stem of the normally vertical centering member of a biasing mechanism by a slidable ball and socket joint between them. The centering member has a flat circular base perpendicular to its stem which is positioned by a spring actuated means tending to restrain the base against the flat surface of the support of the mechanism.

Figure 2:
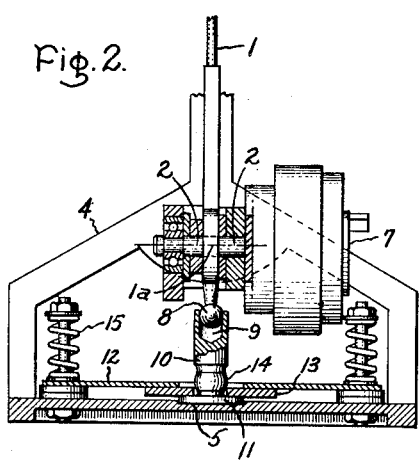
Figure 3:
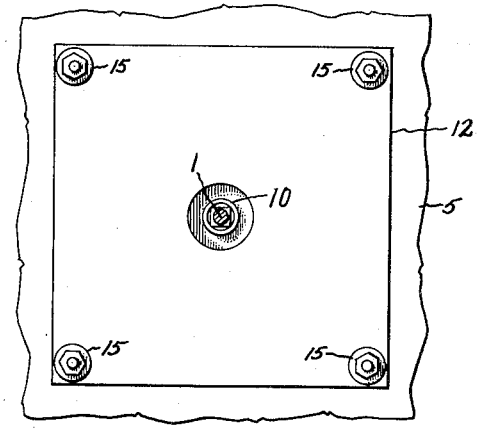
Figure 4:
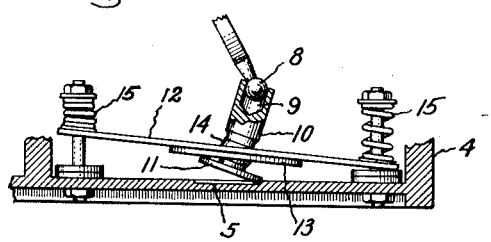

For a more complete understanding of my invention, reference is made to the accompanying drawing of one embodiment of my invention in connection with an aircraft automatic pilot in which Fig. 1 is an elevation view of the universal control mechanism; Fig. 2 is a section taken along the broken line 2—2 of Fig. 1 looking in the direction of the arrows; Fig. 3 is a plan view of the plate looking in the direction of the arrows 3—3; Fig. 4 is a partial elevation view of the plate with the control stick deflected.

In the drawing, a control stick 1 is pivoted upon trunnions 2 rotatable about a fixed pivot point 1a. The trunnions 2 are journaled in a gimbal 3 which is pivotally mounted on a support composed of brackets 4 and a base 5, and are also rotatable about the point 1a. Rotation about the trunnion 2 operates a Selsyn 6 controlling the elevators of an aircraft. Rotation of the gimbal 3 operates the Selsyn 7 controlling a combination of ailerons and rudder of the aircraft. An extension of control stick 1 ends in a ball 8 that is constrained within a socket in the cylindrical stem of the erection mechanism centering member 10 to form a sliding ball and socket joint between the control stick and the centering member. The stem of the centering member is perpendicular to a circular platen base 11 which tends to be restrained against the flat surface of the support in a recess 5 slightly larger than the base of the member by a pressure plate 12 with an oversize hole through which the stem 10 projects. The recess in the base 5 prevents sidewise movement of the base 11. A washer 13 around the stem keeps the base 11 from entering the hole in the pressure plate. Where the centering member passes through the spacer and the plate the stem is modified into a circular bulge 14. Springs 15 are so mounted around the periphery of the plate 9 as to bias the plate toward the base of the support.

As the top of the control stick is moved in any direction, as shown by the dotted outline in Fig. 1, the top of the centering member moves in the opposite direction causing that member to pivot upon the bottom rim of its base. With the pivot point as a fulcrum the base tilts raising the spacer and plate against the spring. Upon release of the control stick, the base is forced by pressure plate to bottom on the base of the mechanism and the stick returns to neutral. The restoring pressure on the plate in any position of the stick feels practically the same to the operator since the springs used are soft—being only strong enough to assure a positive return to center when the control stick is released.

What I claim as new and desire to secure by Letters Patent of the United States is:

1. A mechanism for centering a universally pivoted control handle, a support provided with a substantially flat surface, a centering member provided with a flat bottomed base normally seated on said surface, a slidable ball and socket joint between said handle and the end of said member opposite said base, a plate restraining means provided with an aperture through which said centering member extends, and springs biasing said plate means into engagement with said base so as to restrain said base against said flat surface.

2. A mechanism for centering a universally pivoted control handle provided with a support having a substantially flat surface adjacent said handle, said mechanism comprising a centering member provided with a flat bottomed base normally seated on said surface, a plate restraining means provided with an aperture through which said centering member extends, springs biasing said plate means into engagement with said base so as to hold said base against said flat surface, and a slidable ball and socket joint formed on the end of said handle and the end of said member opposite said base and connecting said ends so that when said centering member is seated flat against said surface the control handle is centered.

3. An automatic centering universal control mechanism comprising a support provided with a substantially flat surface, a control handle universally pivoted about an intermediate point thereof, said intermediate point being disposed in spaced relation to said flat surface, a centering member provided with a flat base normally seated on said flat surface, a slidable ball and socket joint connecting said handle and said member and means biased from said support and engaging said centering member whereby said flat base is restrained towards engagement with said flat surface thereby to bias said handle to the center position thereof.

4. An automatic centering universal control mechanism comprising a support provided with a substantially flat surface, a control handle universally pivoted about an intermediate point thereof, said intermediate point being disposed in spaced relation to said flat surface, a centering member provided with a flat base, a slidable ball and socket joint connecting said handle and said member and means biased from said support and engaging said centering member including a flat pressure plate engaging said centering member whereby said flat base is restrained towards engagement with said flat surface thereby biasing said handle to the center position thereof.

5. An automatic centering universal control mechanism comprising a support provided with a substantially flat surface, a control handle universally pivoted about an intermediate point thereof, said intermediate point being disposed in spaced relation to said flat surface, a centering member provided with a flat base, a slidable ball and socket joint connecting said handle and said member, a flat pressure plate engaging said centering member and having a portion thereof projecting around said member, a plurality of pins extending through said projecting portion and spaced around the periphery of said centering member, each of said pins having an end thereof secured by said support and spiral springs surrounding said pins and biasing said plate from the opposite ends of said pins whereby said flat base is restrained towards engagement with said flat surface thereby biasing said handle to the center position thereof.

WILLIAM W. WILLOUGHBY.

REFERENCES CITED

The following references are of record in the file of this patent:

UNITED STATES PATENTS

| Number | Name | Date |
| --- | --- | --- |
| 2,038,013 | Temple | Apr. 21, 1936 |
| 2,099,244 | Temple | Nov. 16, 1937 |
| 2,453,945 | Spose | Nov. 16, 1948 |

FOREIGN PATENTS

| Number | Country | Date |
| --- | --- | --- |
| 520,068 | Great Britain | Apr. 12, 1940 |